(12) United States Patent
Rihn et al.

(10) Patent No.: US 9,645,643 B2
(45) Date of Patent: May 9, 2017

(54) MOBILE DEVICE WITH MOTION CONTROLLING HAPTICS

(71) Applicant: IMMERSION CORPORATION, San Jose, CA (US)

(72) Inventors: William Rihn, San Jose, CA (US); David Birnbaum, Oakland, CA (US); Yiting Wang, San Jose, CA (US); Vincent Levesque, Montreal (CA); Danny Grant, Laval (CA)

(73) Assignee: IMMERSION CORPORATION, San Jose, CA (US)

( * ) Notice: Subject to any disclaimer, the term of this patent is extended or adjusted under 35 U.S.C. 154(b) by 249 days.

(21) Appl. No.: 14/306,600

(22) Filed: Jun. 17, 2014

(65) Prior Publication Data

US 2015/0362994 A1 Dec. 17, 2015

(51) Int. Cl.
*G06F 3/01* (2006.01)
*H04M 1/18* (2006.01)
*H04M 1/725* (2006.01)

(52) U.S. Cl.
CPC ............ *G06F 3/016* (2013.01); *H04M 1/185* (2013.01); *H04M 1/72519* (2013.01); *H04M 2250/12* (2013.01)

(58) Field of Classification Search
None
See application file for complete search history.

(56) References Cited

U.S. PATENT DOCUMENTS

| 7,742,036 B2* | 6/2010 | Grant ................... G06F 3/016 345/156 |
| 9,285,905 B1* | 3/2016 | Buuck ................... G06F 3/041 |
| 2006/0223547 A1 | 10/2006 | Chin et al. |
| 2009/0309825 A1 | 12/2009 | Sodergren et al. |
| 2011/0109423 A1* | 5/2011 | Ramsay ................ B25J 9/1689 340/3.1 |
| 2013/0226754 A1 | 8/2013 | Boldyrev et al. |
| 2013/0257582 A1 | 10/2013 | Rothkopf et al. |
| 2014/0004906 A1* | 1/2014 | Chi ........................ H04B 1/38 455/566 |

FOREIGN PATENT DOCUMENTS

WO 2012087625 A2 6/2012

* cited by examiner

*Primary Examiner* — Seokyun Moon
(74) *Attorney, Agent, or Firm* — Miles & Stockbridge P.C.

(57) ABSTRACT

A haptically enabled device includes a haptic output device used to control motion. The haptically enabled device determines a desired motion, and then generates a haptic effect on the haptic output device to cause the desired motion.

20 Claims, 9 Drawing Sheets

Fig. 9

MOBILE DEVICE WITH MOTION CONTROLLING HAPTICS

FIELD

One embodiment is directed generally to a mobile device, and in particular to a mobile device that includes haptics.

BACKGROUND INFORMATION

Portable/mobile electronic devices, such as mobile phones, smartphones, camera phones, cameras, personal digital assistants ("PDA"s), etc., typically include output mechanisms to alert the user of certain events that occur with respect to the devices. For example, a cell phone normally includes a speaker for audibly notifying the user of an incoming telephone call event. The audible signal may include specific ringtones, musical ditties, sound effects, etc. In addition, cell phones may include display screens that can be used to visually notify the users of incoming phone calls.

In some mobile devices, kinesthetic feedback (such as active and resistive force feedback) and/or tactile feedback (such as vibration, texture, and heat) is also provided to the user, more generally known collectively as "haptic feedback" or "haptic effects". Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

SUMMARY

One embodiment is a haptically enabled device that includes a haptic output device used to control motion. The haptically enabled device determines a desired motion, and then generates a haptic effect on the haptic output device to cause the desired motion.

DETAILED DESCRIPTION

In addition to providing alerts, as described above, haptic effects in accordance with embodiments of the present invention can also be used to create motion or control motion for mobile devices. For example, haptic effects can cause mobile devices to move in a certain way to provide alerts/information to a user, or can be controlled to prevent a mobile device from falling off a surface and being damaged.

Figure 1:
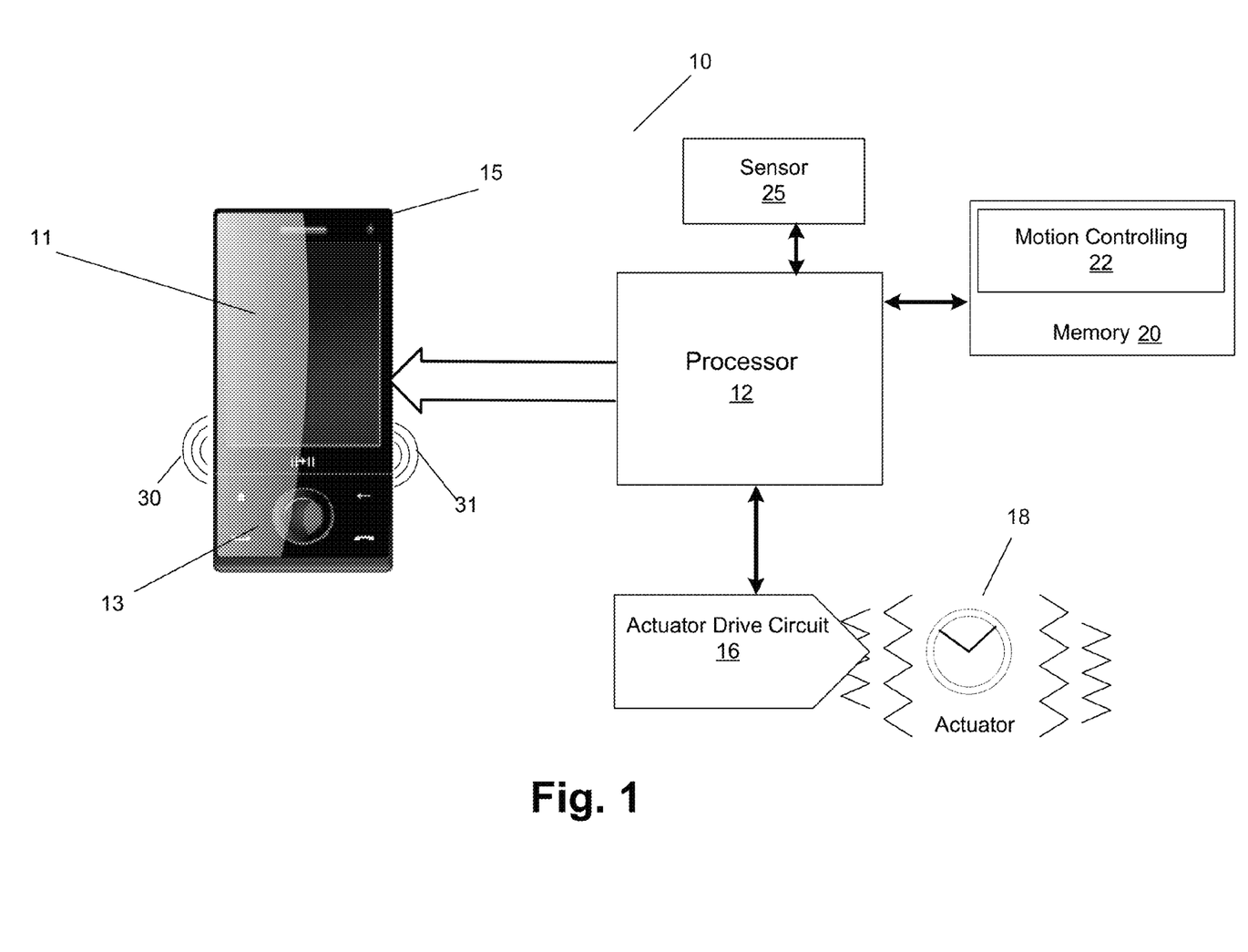
FIG. 1 is a block diagram of a haptically-enabled system in accordance with one embodiment of the present invention.

FIG. 1 is a block diagram of a haptically-enabled system 10 in accordance with one embodiment of the present invention. System 10 includes a touch sensitive surface 11 or other type of user interface mounted within a housing 15, and may include mechanical keys/buttons 13.

Internal to system 10 is a haptic feedback system that generates haptic effects on system 10 and includes a processor or controller 12. Coupled to processor 12 is a memory 20, and an actuator drive circuit 16 which is coupled to an actuator 18. Processor 12 may be any type of general purpose processor, or could be a processor specifically designed to provide haptic effects, such as an application-specific integrated circuit ("ASIC"). Processor 12 may be the same processor that operates the entire system 10, or may be a separate processor. Processor 12 can decide what haptic effects are to be played and the order in which the effects are played based on high level parameters. In general, the high level parameters that define a particular haptic effect include magnitude, frequency and duration. Low level parameters such as streaming motor commands could also be used to determine a particular haptic effect. A haptic effect may be considered "dynamic" if it includes some variation of these parameters when the haptic effect is generated or a variation of these parameters based on a user's interaction. The haptic feedback system in one embodiment generates vibrations 30, 31 on system 10.

Processor 12 outputs the control signals to actuator drive circuit 16, which includes electronic components and circuitry used to supply actuator 18 with the required electrical current and voltage (i.e., "motor signals") to cause the desired haptic effects. System 10 may include more than one actuator 18, and each actuator may include a separate drive circuit 16, all coupled to a common processor 12.

Memory 20 can be any type of storage device or computer-readable medium, such as random access memory ("RAM") or read-only memory ("ROM"). Memory 20 stores instructions executed by processor 12. Among the instructions, memory 20 includes motion controlling module 22 which are instructions that, when executed by processor 12, generates haptic effects with motion control, as disclosed in more detail below. Memory 20 may also be located internal to processor 12, or any combination of internal and external memory.

System 10 further includes a sensor 25 coupled to processor 12 that provides data that can be used by processor 12 to determine any parameters or metrics needed for generating haptic effects. Sensor 25 in communication with processor 12 may help to determine the orientation of system 10 or the distance from another object or a potential point of contact (e.g., the distance (or how much time) to an impact surface such as the floor). System 10 may include a single sensor 25, or multiple sensors 25. Sensors 25 may include an accelerometer, gyroscopic sensor, distance, position or orientation sensors (e.g., radar, ultrasonic, magnetometer), location sensors (e.g., global position system ("GPS"), signal triangulation), image sensors (e.g., camera), sound or audio sensors (e.g., speakers, microphones) which may be used as a sonar combination, etc. Sensor 25 may also be a motion sensor or array of sensors that takes measurements as system 10 is carried around, and the measurements can be used by processor 12 to generate a virtual map of the immediate physical world.

Actuator 18 may be, for example, an electric motor, an electro-magnetic actuator, a voice coil, a shape memory alloy, an electro-active polymer, a solenoid, an eccentric rotating mass motor ("ERM"), a linear resonant actuator ("LRA"), a piezoelectric actuator, a high bandwidth actuator, an electroactive polymer ("EAP") actuator, an electrostatic friction display, or an ultrasonic vibration generator. In alternate embodiments, system 10 can include one or more additional actuators, in addition to actuator 18 (not illustrated in FIG. 1). Actuator 18 is an example of a haptic effect output device configured to output haptic effects, such as vibrotactile haptic effects, electrostatic friction haptic effects, or deformation haptic effects, in response to a drive signal.

In addition to or in place of actuator 18, system 10 may include other types of haptic output devices (not shown) that may be non-mechanical or non-vibratory devices such as devices that use electrostatic friction ("ESF"), ultrasonic surface friction ("USF"), devices that induce acoustic radiation pressure with an ultrasonic haptic transducer, devices that use a haptic substrate and a flexible or deformable surface or shape changing devices and that may be attached to a user's body, devices that provide projected haptic output such as a puff of air using an air jet, etc.

System 10 may be any type of handheld/mobile device, such as a cellular telephone, personal digital assistant ("PDA"), smartphone, computer tablet, gaming console, remote control, or any other type of device that includes a haptic effect system that includes one or more actuators. System 10 may be a wearable device such as wrist bands, headbands, eyeglasses, rings, leg bands, arrays integrated into clothing, etc., or any other type of device that a user may wear on a body or can be held by a user and that is haptically enabled. The user interface of system 10 may be a touch sensitive surface, or can be any other type of user interface such as a mouse, touchpad, mini-joystick, scroll wheel, trackball, game pads or game controllers, etc. In embodiments with more than one actuator, each actuator may have a different rotational capability in order to create a wide range of haptic effects on the device. Not all elements illustrated in FIG. 1 will be included in each embodiment of system 10. In many embodiments, only a subset of the elements are needed. Further, system 10 may be a central controller that controls and provides signals that generate haptic effects to control motion on remotely coupled haptically enabled devices.

In one embodiment, the combination of one or more actuators 18 or other haptic output devices can be used to control/stop the motion of system 10. The motion can be controlled to cause a specific movement of system 10, or to prevent system 10 from moving when a haptic effect based alert may otherwise be generated, and the motion can be used to create another type of haptic effect based alert. For example, a specific alert might move system 10 forward and backward for one event or side-to-side for another. System 10 could sense that it was in motion, such as about to fall off of a dashboard, and use actuators 18 or any type of haptic output devices such as ESF to compensate in order to prevent the fall. Further, in order to control actuators 18, system 10 may intelligently adjust haptic strength based upon the user's orientation of the device (for example, weaker haptic effects (e.g., less magnitude) if face down in order to avoid disturbing the user).

Figure 2:
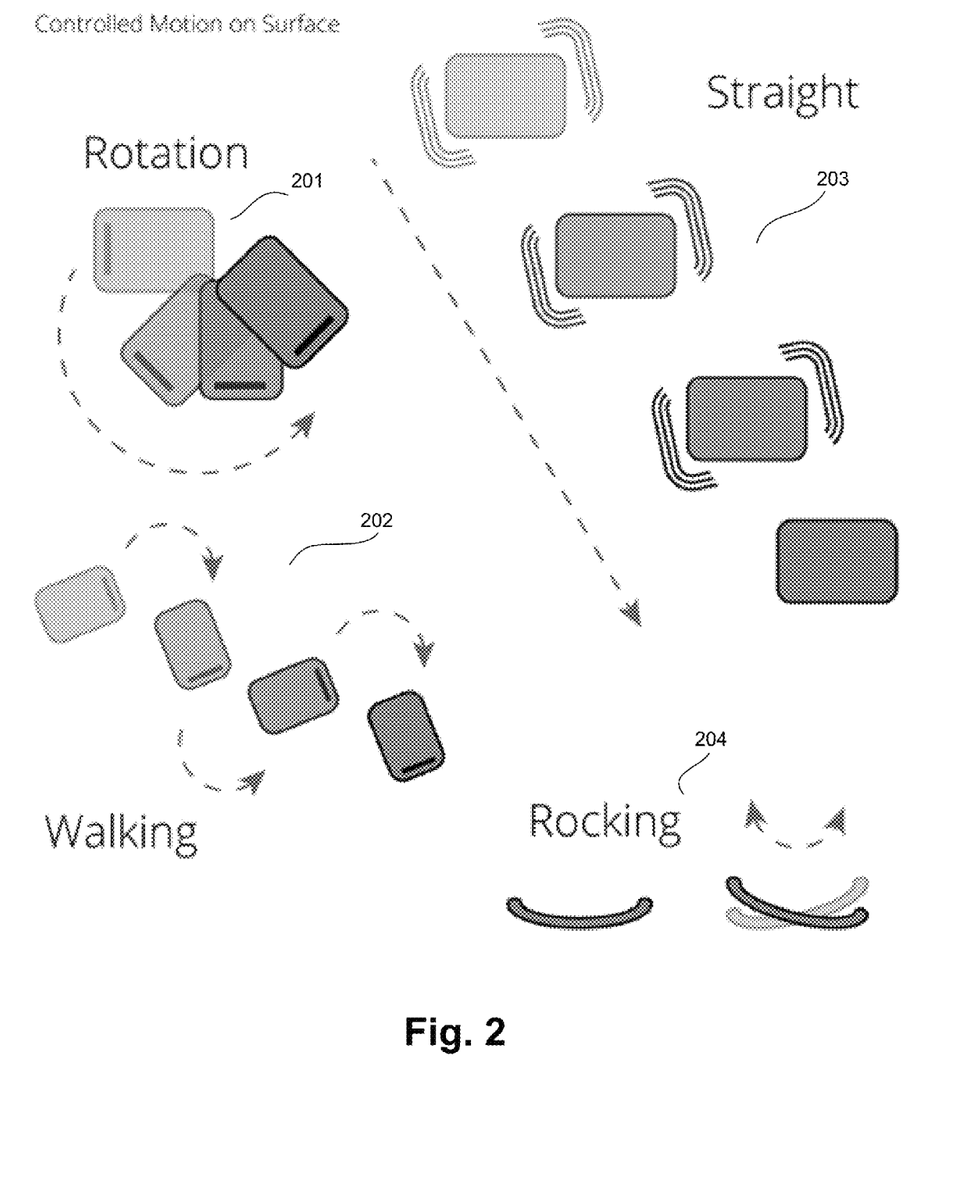
FIG. 2 illustrates some example motions for the system that can be implemented in accordance with various embodiments.

FIG. 2 illustrates some example motions for system 10 that can be implemented in accordance with various embodiments. The motions in general are implemented by controlling the actuators or other haptic output devices of system 10, including actuators such as ERMs, Piezos, LRAs, or ESFs. The motions include a rotation motion at 201, a walking motion at 202, a straight motion at 203, and a rocking motion at 204. For the rocking motion, housing 15 of system 10 is curved, either as a fixed shape or having the ability to transform from a flat form to curved, and vice versa.

Controlling the motion of system 10 in accordance with embodiments of the invention, as shown in FIG. 2, has many applicable uses. For example, users frequently leave mobile devices on the table with the screen down while otherwise occupied. When a haptic effect based alert (e.g., a vibration) occurs in this environment, the device will usually rumble and move around the table in a random, unpleasant, and non-designed manner. By controlling the movement of the device, embodiments can remove an unpleasant event associated with haptic alerts (e.g., an obnoxious rumble that may garner more attention than necessary) and also enable the user to be made aware of specific events they may assign a higher priority (e.g., a vibration with no whole-device movement for low priority alerts, and whole-device movement for high priority alerts). Further, compensating movement of the device with actuators to prevent a fall may prevent damaging the device.

One example of preventative compensation to prevent a fall is in the context of a car dashboard. Third party peripherals dedicated to holding devices in a cradle or keeping them from sliding off a smooth surface are a significant portion of device accessory sales. Embodiments can compensate to prevent the device from falling out of the cradle or off of a surface either with a combination of actuation control, ESF, or some other technology.

Further, for curved devices such as shown at 204 of FIG. 2, additional applications for embodiments are possible. For example, if the user rocks or tilts a device along an axis of one of the device's curves to initiate an interaction, an actuator could be employed to slow its motion or to stop it completely. Conversely, an actuator could be used to rock the device back and forth to signify an incoming call or other notification, and a single back-and-forth rock can signify an incoming message. The number and/or speed of oscillations could be used to represent to the user the type of incoming message. The type of notification could be represented by the frequency or magnitude of the rocking, or other parameter.

Self-locomotion, such as shown in FIG. 2, can cause a lost television remote controller or game controller to migrate itself back to a "home base" or a charging station when low on battery life. Embodiments also have applications in gaming in addition to controllers. For example a board game can have intelligent pieces that move themselves, or a mobile phone can include racing style games where a user draws a path and races their device against another. Further, embodiments allow for a new style of gaming by bridging the gap between the capabilities of toys that move and mobile devices by, for example, drawing a route on the device's screen and allowing it to move in that manner.

Figure 3:
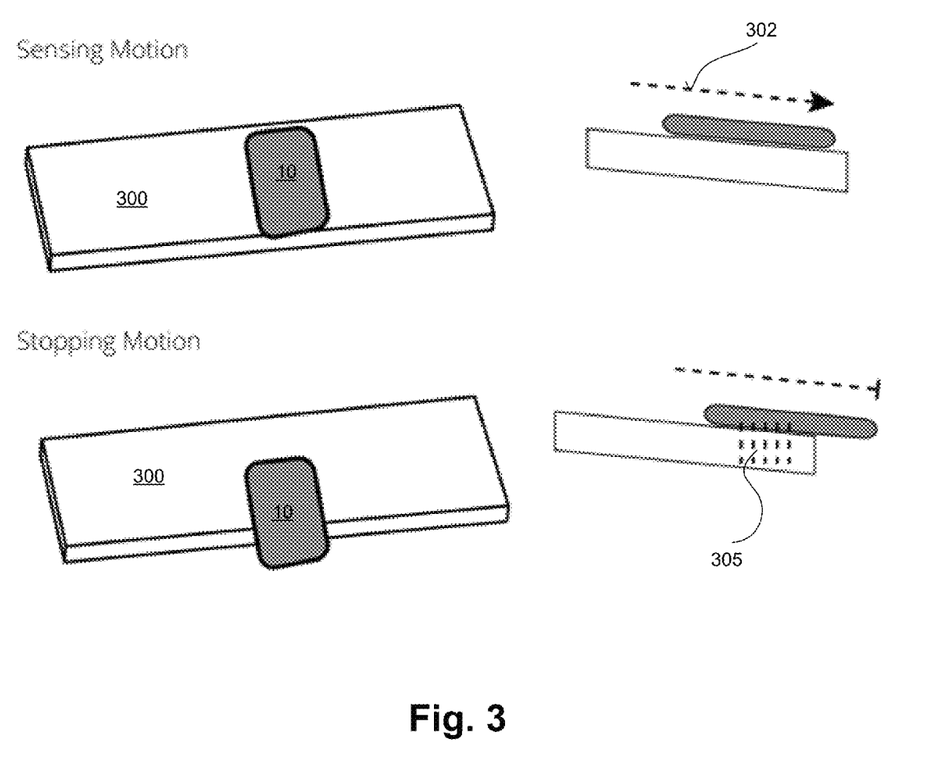
FIG. 3 illustrates the system on a surface in accordance with one embodiment.

FIG. 3 illustrates system 10 on a surface 300 in accordance with one embodiment. Embodiments determine a state of sliding motion (302) relative to surface 300. System 10 can then stop the motion to prevent it from falling off of the surface. Actuators can be used to change the direction of motion or stop the motion, or a ESF haptic output device can be used to increase the amount of static friction 305 between system 10 and surface 300 to stop the sliding motion.

System 10 could sense specific patterns in the motion to determine if actuators should stop a device moving both from environmental changes that cause a device to move or if a user touches the device which causes continual motion (such as with curved devices). An example of environmental changes is vibrations from driving that might cause a device to move towards the edge and potentially fall off of a dashboard mounted holder. In these situations, the actuator would activate to compensate for the device's motion in order to stop it. Further, if system 10 is found to be in need of a charge it could intelligently determine when it is not in use and move itself to a charging station. Further, motion could be caused by a underlying surface that moves (e.g., a sheet is pulled from under the device or a book cover on which it is resting is slightly opened). Further, motion could be caused by an impact against the surface or a vibration that causes the device to start sliding (e.g., the car's motor causes a vibration, or someone bumps their knee against a table). Other motion causing examples include wind blowing the device away or making it rock, or another object bumping against the device and causing it to start sliding, if on a slightly slanted surface. The detection of motion can involve determining the device's acceleration. If the device is accelerating, it is probably going to fall or move too far.

Figure 4:
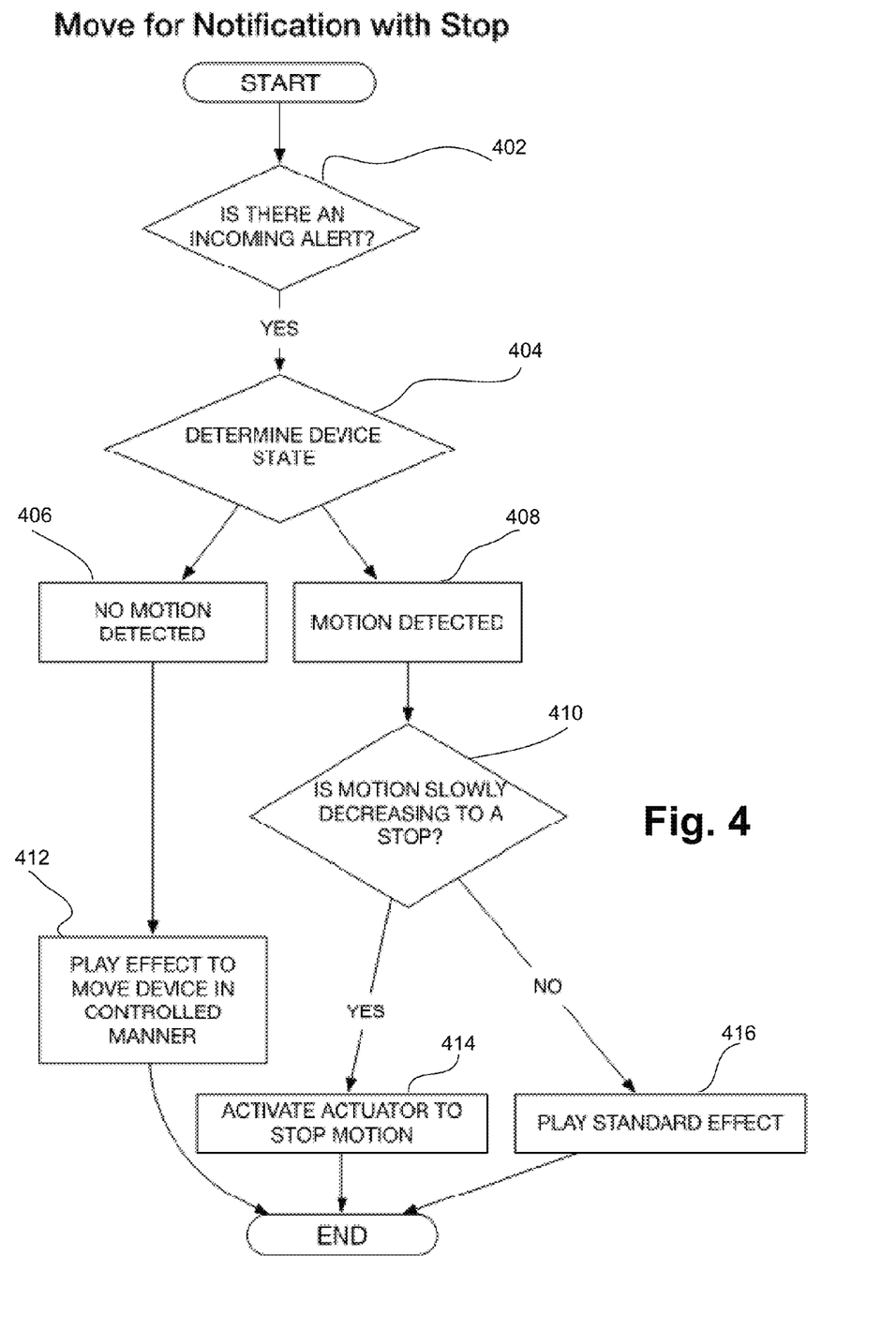
FIG. 4 is a flow diagram of the functionality of the motion controlling module of FIG. 1 when providing haptic effects with motion control by moving the system/device for notification purposes in accordance with one embodiment.

FIG. 4 is a flow diagram of the functionality of motion controlling module 22 of FIG. 1 when providing haptic effects with motion control by moving system/device 10 for notification purposes in accordance with one embodiment. In one embodiment, the functionality of the flow diagram of FIG. 4, and FIGS. 5 and 8 below, is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 402, it is determined if there is an incoming alert. For example, there may be an incoming telephone call, new calendar appointment, or new incoming text that requires an alert on system 10. If there is no incoming alert, the functionality ends.

If there is an incoming alert, at 404 the device state is determined. For example, it may be determined whether the device is in motion using, for example, sensor 25 as an accelerometer. At 406, no motion is detected. At 408, motion is detected.

If no motion is detected, at 412 a haptic effect is generated/played to move the device in a controlled manner or in a "desired motion." For example, if system 10 has a curved housing, haptic output devices can cause system 10 to rock to indicate the incoming alert. In another embodiment, one or more specifically placed actuators can cause system 10 to rotate, as shown at 201 of FIG. 2.

If motion is detected, at 410 it is determined if the motion is slowly decreasing to a stop. If yes, at 414 the actuator is activated to stop the motion. If no, at 416 the standard haptic effect is played to provide the alert. The purpose of the functionality beginning at 410 is to determine if a device is moving as a result of human interaction, rather than to signify a notification (i.e., whether the motion is intentional or not). For example, if a curved device is checked by pressing on one edge to rotate the screen upwards, it might rock back and forth when the finger is removed. The functionality beginning at 410 would stop that action to avoid unpleasantness and false notification. For these embodiments, the "desired motion" is the stopping of the current motion (e.g., stopping the rocking). In these embodiments, haptic output devices can stop the motion to achieve the desired motion.

Figure 5:
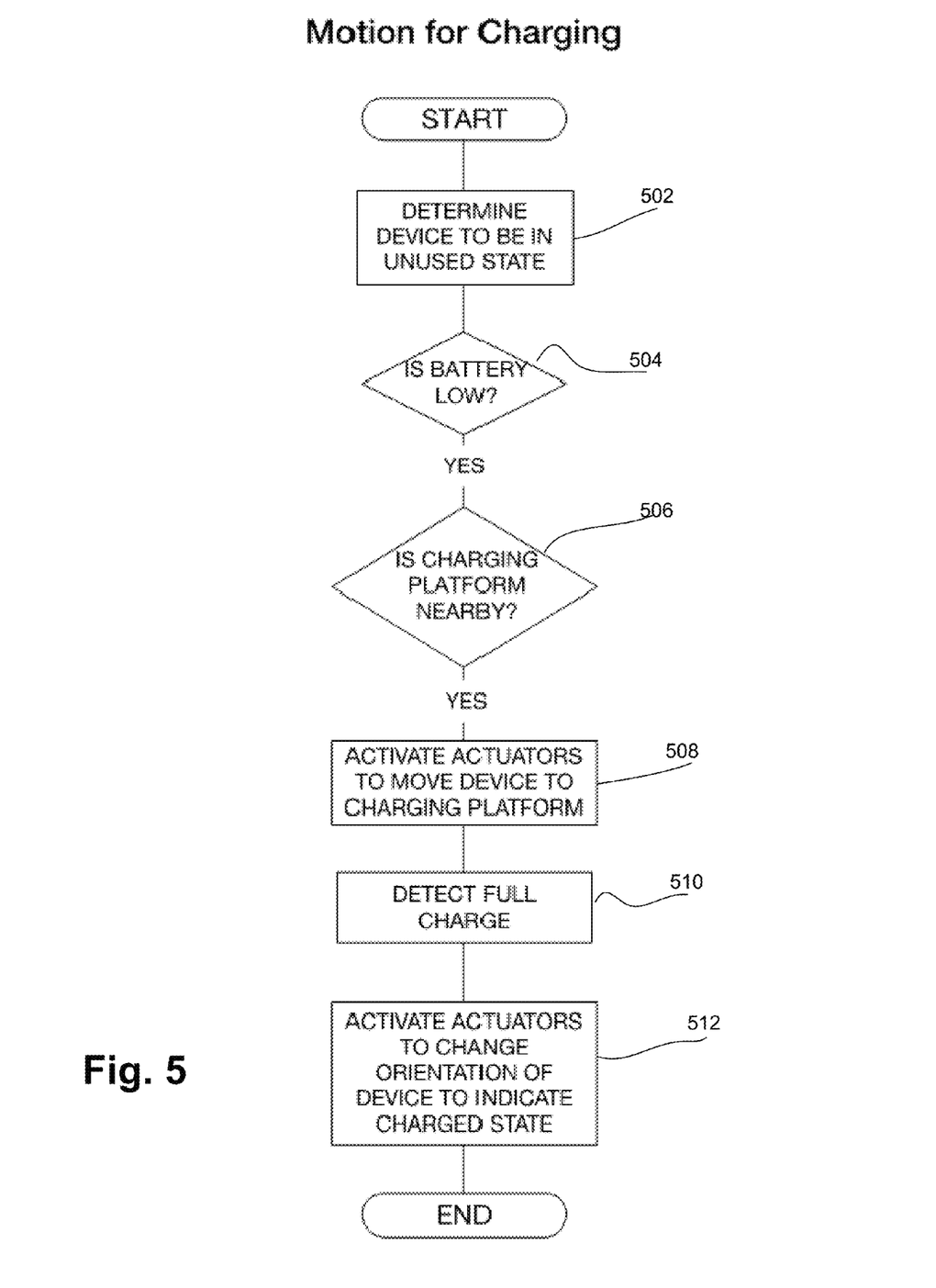
FIG. 5 is a flow diagram of the functionality of the motion controlling module of FIG. 1 when providing haptic effects with motion control when moving the system/device to a charger in accordance with one embodiment.

FIG. 5 is a flow diagram of the functionality of motion controlling module 22 of FIG. 1 when providing haptic effects with motion control when moving system/device 10 to a charger in accordance with one embodiment.

At 502, it is determined if the device is in an unused state. At 504, it is determined if the battery is low. Sensor 25 can function as a battery state of charge ("SoC") measurement to determine the charge level. If the device is not in an unused state or the battery is not low, the functionality ends.

At 506, it is determined if a charging platform is nearby. The charging platform can be a wireless pad or mat that merely requires the device to be touching in order to charge the device. The charging platform can also be an easily manipulable plug-in type. Sensor 25 can determine if the platform is nearby using wireless signals, for example. If there is not a charging platform nearby, functionality ends.

At 508, the one or more actuators are activated on the device to move the device near the platform. For example, the actuators can cause movement similar to 202 and 203 of FIG. 2. Charging then is initiated.

At 510, a full charge is detected. At 512, the one or more actuators are activated to change orientation of the device to indicate a charged state, for example by rotating as shown at 201 of FIG. 2.

As previously described, when a mobile device is placed on an uneven surface or close to the edge of a surface, a notification in the form of a vibratory haptic effect or other motion based effects can cause the device to fall off of the surface, possibly damaging the device. Therefore, in some embodiments of the present invention, the haptic effects are motion "controlled" so that all notifications may be switched off in response to sensing the surface level and the distance between the surface and the ground.

Figure 6:
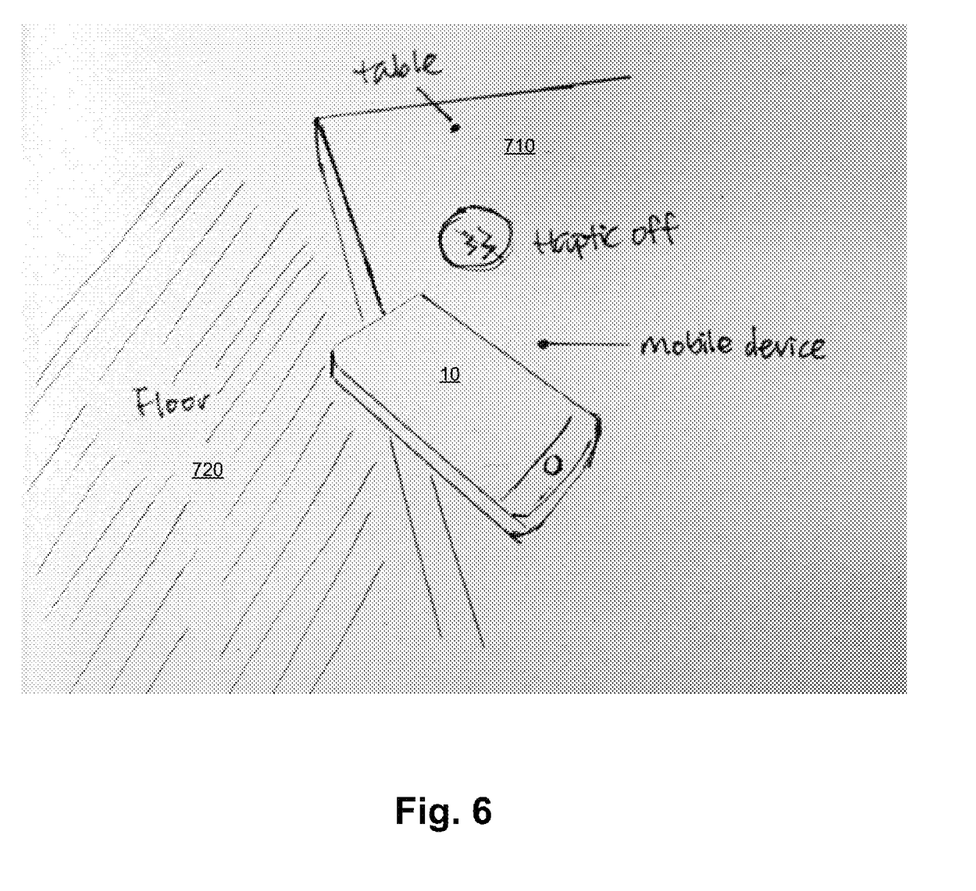
FIG. 6 illustrates an example of motion control to prevent the system from falling off of a surface in accordance with one embodiment of the present invention.

FIG. 6 illustrates an example of motion control to prevent system 10 from falling off of a surface in accordance with one embodiment of the present invention. As shown in FIG. 6, device/system 10 has been placed on or near the edge of a table 710 or other substantially flat surface. Sensor 25 can detect the position of system 10, as well as its distance from the floor 720. In some embodiments, sensor 25 functions as a proximity sensor and gyroscope to determine its position. If it is determined that system 10 is at risk of falling off of table 710 when a haptic effect based alert is generated, and optionally taking into account the distance to floor 720, system 10 will turn the haptic effects off or suppress the haptic effects before or when the alert is to be initiated.

Figure 7:
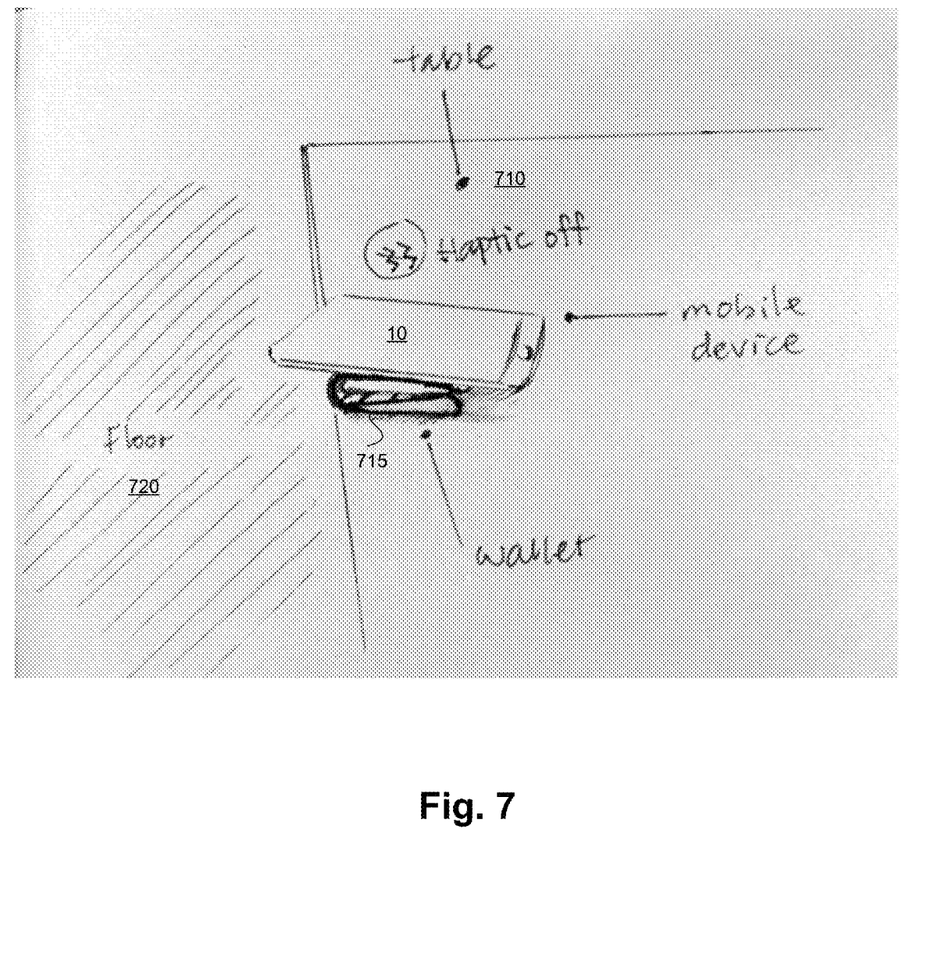
FIG. 7 illustrates an example of motion control to prevent the system from falling off of a surface in accordance with another embodiment of the present invention.

FIG. 7 illustrates an example of motion control to prevent system 10 from falling off of a surface in accordance with another embodiment of the present invention. As shown in FIG. 7, device/system 10 has been placed on a wallet 715 or another type of uneven surface. Sensor 25 can detect the position of system 10, as well as its distance from the floor 720. Similar as to FIG. 6, system 10 determines if the haptic effect based alert will cause system 10 to fall off table 710, and if so turns off the haptic effects before or when the alert is initiated.

Figure 8:
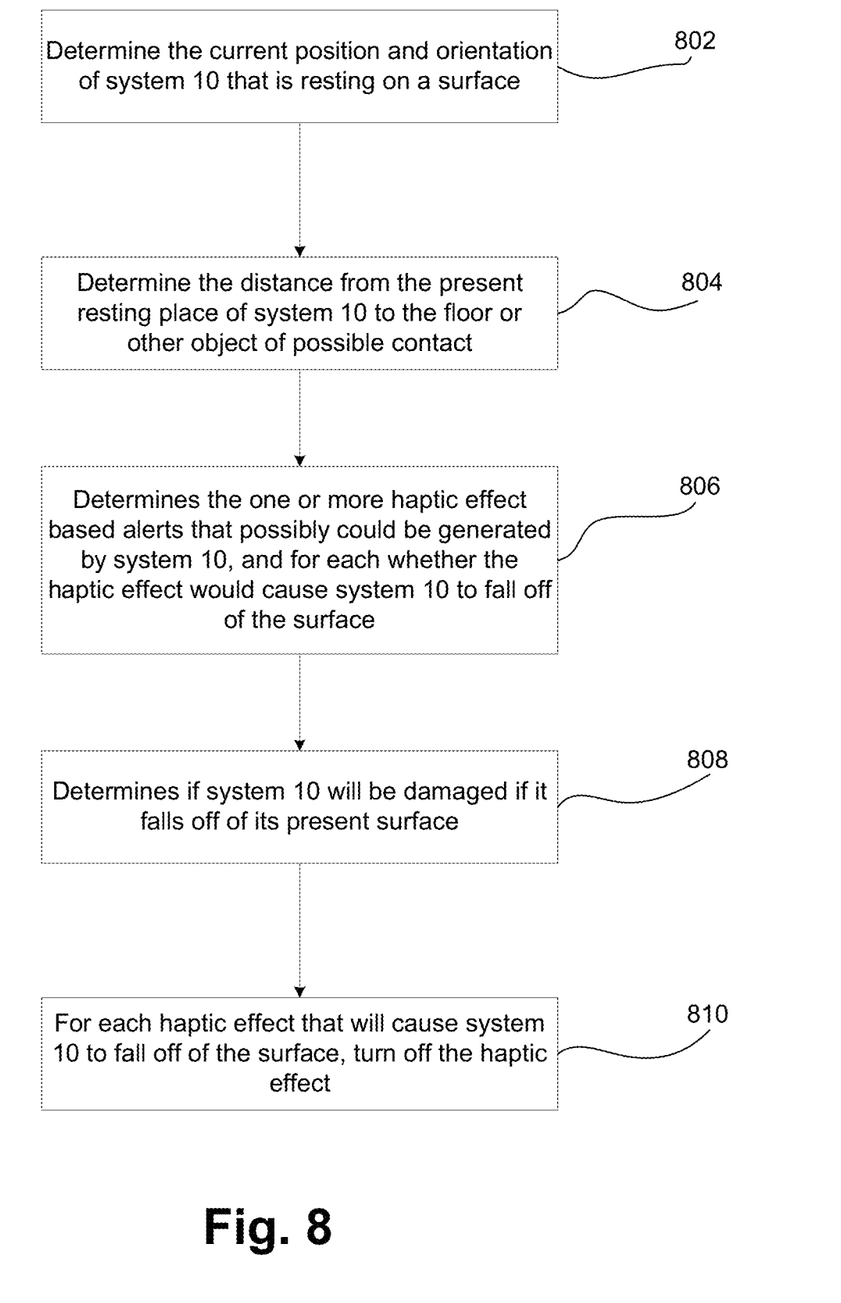
FIG. 8 is a flow diagram of the functionality of the motion controlling module of FIG. 1 when providing haptic effects with motion control for the system to prevent the system from falling from a surface in accordance with one embodiment.

FIG. 8 is a flow diagram of the functionality of motion controlling module 22 of FIG. 1 when providing haptic effects with motion control for system 10 to prevent system 10 from falling from a surface in accordance with one embodiment.

At 802, module 22, with input from sensors 25, determines the current position and orientation of system 10 that is resting on a surface. For example, system 10 may be on the edge of a table or other substantially flat surface, or may be at an angle on an uneven surface.

At 804, module 22, with input from sensors 25, determines the distance from the present resting place of system 10 to the floor or other object of possible contact.

At 806, module 22 determines the one or more haptic effect based alerts that possibly could be generated by system 10, and for each whether the haptic effect would cause system 10 to fall off of the surface based on the determinations at 802 and 804.

At 808, module 22 determines if system 10 will be damaged if it falls off of its present surface based on the determination at 804.

At 810, for each haptic effect that will cause system 10 to fall off of the surface, that haptic effect will be turned off, at least temporarily until system 10 is moved. In another embodiment, the haptic effect will only be turned off if it was determined at 808 whether a fall from the surface would cause system 10 to be damaged.

Figure 9:
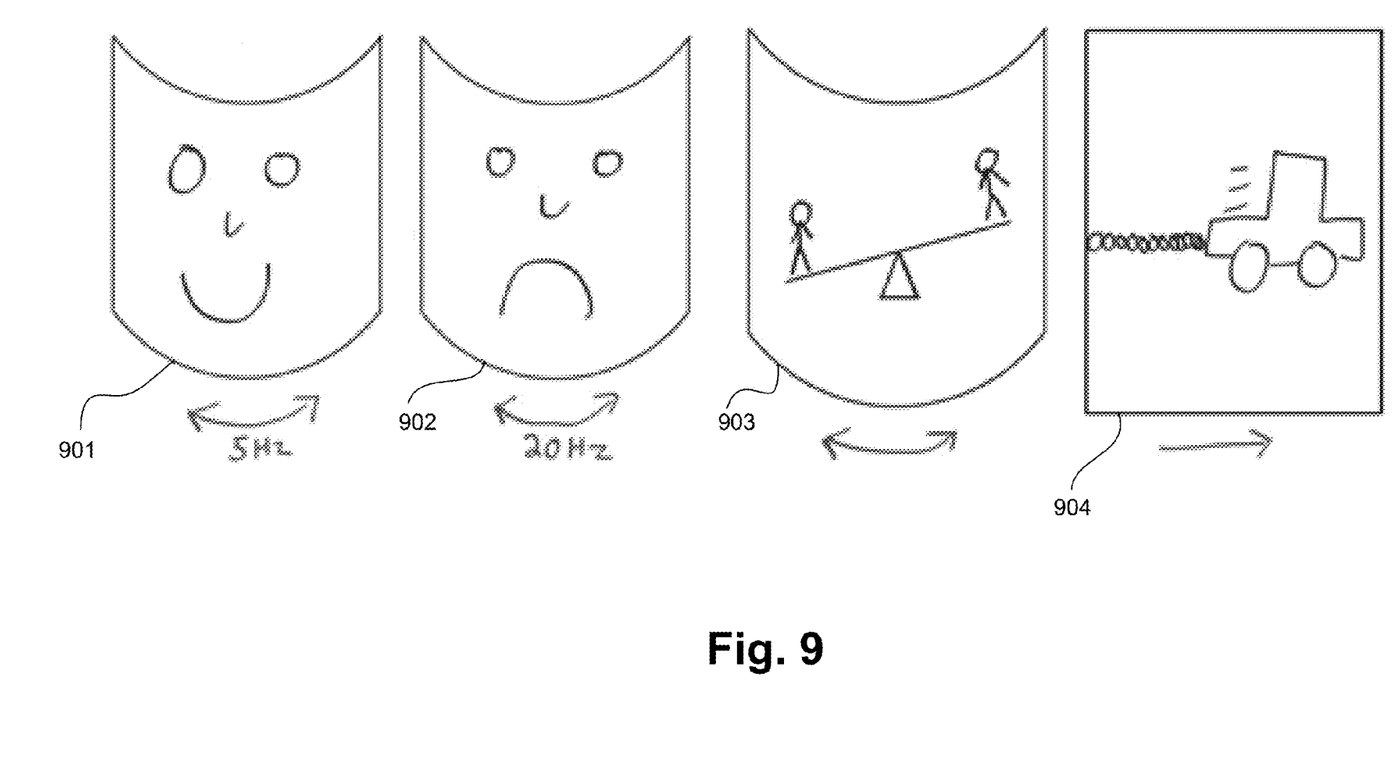
FIG. 9 illustrates some example visual feedback that is combined with motion in accordance with embodiments of the present invention.

Further to as disclosed above, in one embodiment the motion of system 10 is combined with visual feedback in order to give the user a mental model of the cause of the motion. FIG. 9 illustrates some examples of visual feedback that is combined with motion in accordance with embodiments of the present invention. As shown at 901 and 902 for a curved device, system 10 can be anthropomorphized by displaying a human, animal or cartoonish face. The motion of the display can be mapped either to the motion of the face (e.g., pointing in a direction or shaking) or to the emotion expressed with facial expression (e.g., anger or boredom). For example, a "bored" phone could roll slowly, while an "angry" phone could roll much faster.

System 10 can also display an animation that provides a physical model for its motion. A virtual character can, for example, be shown to push against an edge of the screen as system 10 moves in that direction. Two characters could similarly be shown to play on a seesaw as the system 10 slowly rolls, as shown at 903 for a curved device. Sails, wheels and other motion mechanisms could similarly be shown to support the motion, as shown at 904 for a flat non-curved device.

As disclosed, the motion for one embodiment is a rocking motion when system 10 has a curved housing, as shown at 204 of FIG. 2. In one embodiment, a "Haptuator" from Tactile Labs Inc., which is a high-bandwidth vibrotactile transducer that moves a mass along the long axis of its enclosure, is mounted on the center of the housing, with the motion across the curve. The optimal driving signal for the Haptuator implementation in one embodiment is a sinusoid with a frequency of 8-10 Hz. However, the optimal frequency will ultimately depend on the dynamics of the system (e.g. the mass of the device).

In another embodiment, an ERM is placed on one side of the curved housing to cause the rocking. The motion in one embodiment is greatest when the ERM was slightly off to the side. Multiple ERM actuators can also be used to rock the device for example placing one actuator on each side of the device and playing the haptic effects so that they are properly phased with the natural resonant frequency of the system. Further, the orientation of the ERM is also an important factor, as coin ERMs can be orientated so that the rotation axis is along the long axis of the curved phone. The optimal signal for the ERM implementation in one embodiment is a train pulse at 6 Hz with pulses of 40 ms. However, the ideal frequency will depend on the dynamics of the device. Other embodiments may generate the rocking motion using, for example, deformable surfaces, an air jet, etc.

Other embodiments provide enhanced control over the rolling by closing the loop with an accelerometer. The accelerometer allows for sensing of the device's actual motion and allows for more optimal timing for the haptic effects. For example, the point at which the rolling reverses direction can be detected and a pulse applied to the ERM at that exact moment can be generated to maximize rolling.

Further, as disclosed, in one embodiment the haptic effects control motion by stopping system 10 from rocking as quickly as possible, when system 10 is a curved device. For example if a user initiates a "tilt" action on the system 10 in order to check email status and then releases system 10, it will rock for a length of time afterward. Haptic effects can be used to quickly suppress this rocking by having the actuators remove energy from the system by counteracting the rocking in the device.

As disclosed, embodiments use haptic effects to control the motion of a device. The haptic effects, for example, can cause the device to move, eliminate movement of the device, or be turned off if the haptic effects would cause the device to fall off of a surface.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of controlling a motion of a haptically enabled device comprising at least one haptic output device, the method comprising:
    determining a desired motion of the haptically enabled device on a surface;
    generating a first haptic effect on the haptic output device to cause the desired motion;
    determining a current motion of the haptically enabled device on the surface using a sensor; and
    generating a second haptic effect to stop the current motion.

2. The method of claim 1, wherein the haptically enabled device comprises a curved housing, and the desired motion is a rocking of the device about an axis parallel to the surface.

3. The method of claim 1, wherein the haptic output device is an actuator.

4. The method of claim 2, wherein the haptic output device is an actuator comprising an eccentric rotating mass mounted on at least one curved side of the haptically enabled device.

5. The method of claim 1, wherein the desired motion provides a notification on the haptically enabled device.

6. The method of claim 1, wherein the desired motion moves the haptically enabled device to a charger for charging the haptically enabled device.

7. The method of claim 1, wherein the desired motion includes:
- a combination of translation in a direction parallel to the surface and rotation about an axis perpendicular to the surface, or
- rotation about an axis parallel to the surface.

8. A haptically enabled device comprising:
- a sensor;
- at least one haptic output device; and
- a controller, coupled to the sensor and the haptic output device, that:
  - determines a desired motion of the haptically enabled device on a surface,
  - generates a first haptic effect on the haptic output device to cause the desired motion,
  - determines a current motion of the haptically enabled device on the surface using a sensor, and
  - generates a second haptic effect to stop the current motion.

9. The haptically enabled device of claim 8, further comprising a curved housing, wherein the desired motion is a rocking of the haptically enabled device about an axis parallel to the surface.

10. The haptically enabled device of claim 8, wherein the haptic output device is an actuator.

11. The haptically enabled device of claim 9, wherein the haptic output device is an actuator comprising an eccentric rotating mass mounted on at least one curved side of the haptically enabled device.

12. The haptically enabled device of claim 8, wherein the desired motion provides a notification on the haptically enabled device.

13. The haptically enabled device of claim 8, wherein the desired motion moves the haptically enabled device to a charger for charging the haptically enabled device.

14. The haptically enabled device of claim 8, wherein the desired motion includes:
- a combination of translation in a direction parallel to the surface and rotation about an axis perpendicular to the surface, or
- rotation about an axis parallel to the surface.

15. A method of controlling a motion of a haptically enabled device comprising at least one haptic output device, the method comprising:
- determining a current position of the haptically enabled device on a surface above a floor;
- determining a distance to the floor;
- receiving a request to generate a haptic effect on the haptically enabled device; and
- preventing or suppressing the haptic effect from being generated based on the distance to the floor.

16. The method of claim 15, wherein the haptic output device is an actuator and the haptic effect is a vibratory haptic effect.

17. The method of claim 15, further comprising determining whether a fall of the haptically enabled device off of the surface would damage the haptically enabled device.

18. The method of claim 15, further comprising determining a distance from the current position to a point of contact for the haptically enabled device.

19. The method of claim 15, wherein the surface is a substantially flat surface having an edge, and the current position of the haptically enabled device is near the edge.

20. The method of claim 15, wherein the surface is an uneven surface.

* * * * *